(12) United States Patent
Pileri et al.

(10) Patent No.: US 8,175,909 B1
(45) Date of Patent: May 8, 2012

(54) INTEGRATING BUSINESS CONSTITUENT INTERACTIONS INTO VALUE GENERATING INFORMATION

(76) Inventors: Douglas C. Pileri, Carmel, IN (US); Paul W. Partridge, Carmel, IN (US)

( * ) Notice: Subject to any disclaimer, the term of this patent is extended or adjusted under 35 U.S.C. 154(b) by 1407 days.

(21) Appl. No.: 10/979,805

(22) Filed: Nov. 3, 2004

Related U.S. Application Data

(60) Provisional application No. 60/516,864, filed on Nov. 3, 2003.

(51) Int. Cl.
*G06Q 10/00* (2012.01)
(52) U.S. Cl. ......................................................... 705/7.29
(58) Field of Classification Search .............. 705/7, 10, 705/7.29
See application file for complete search history.

(56) References Cited

U.S. PATENT DOCUMENTS

| | | | | |
|---|---|---|---|---|
| 5,041,972 | A * | 8/1991 | Frost | 705/10 |
| 5,537,618 | A * | 7/1996 | Boulton et al. | 715/745 |
| 6,574,614 | B1 * | 6/2003 | Kesel | 706/52 |
| 6,922,656 | B2 * | 7/2005 | Butler et al. | 702/183 |
| 2002/0004790 | A1 * | 1/2002 | Yamanishi et al. | 706/12 |
| 2002/0087578 | A1 * | 7/2002 | Vroman | 707/104.1 |
| 2003/0018511 | A1 * | 1/2003 | Bicknell et al. | 705/9 |
| 2003/0126009 | A1 * | 7/2003 | Hayashi et al. | 705/10 |
| 2004/0044562 | A1 * | 3/2004 | Ueno et al. | 705/10 |
| 2004/0138908 | A1 * | 7/2004 | Lowe et al. | 705/1 |
| 2005/0015271 | A1 * | 1/2005 | Iyer | 705/1 |
| 2005/0015273 | A1 * | 1/2005 | Iyer | 705/1 |

OTHER PUBLICATIONS

C. L. Kendall & Frederick A. Russ, "Warranty and Complaint Policies: An Opportunity for Marketing Management," 39 Journal of Marketing 36-43 (1975).*

* cited by examiner

*Primary Examiner* — Neil Kardos
(74) *Attorney, Agent, or Firm* — Fish & Richardson P.C.

(57) ABSTRACT

An integrated, service-based approach to profitable customer loyalty, in which feedback related to an implicated product/process is received from at least two users. The feedback received from the users is aggregated and analyzed to identify the implicated product/process. It is determined whether the aggregated feedback received from the users reaches a threshold level with respect to one or more of the implicated product/process identified. If the threshold level is determined to have been reached, an aspect of the implicated product/process that is related to the aggregated feedback is identified and the identified aspect of the product/process is modified based on the aggregated feedback.

56 Claims, 7 Drawing Sheets

INTEGRATING BUSINESS CONSTITUENT INTERACTIONS INTO VALUE GENERATING INFORMATION

RELATED APPLICATION

This application claims priority from U.S. Provisional Application No. 60/516,864, filed Nov. 3, 2003 which is incorporated by reference.

TECHNICAL FIELD

This application relates to a concept for an integrated, service-based approach to profitable customer loyalty.

BACKGROUND

In every industry, information on customers and prospects is gathered through various interactions with the company. The volume of information is an enormous and a potentially valuable resource. Integrated intelligently, invested in wisely, and used effectively, this information can dramatically affect all parts of the business—from R&D, program management, and marketing & sales, through distribution and on-going customer support. It can be used to increase customer retention, increase future profits, provide direction for product portfolio development, and offer efficient opportunities for more effective market differentiation.

And yet, because of internal practices, information is viewed as a cost to be minimized and data is managed for specific, fragmented purposes. The lack of information integrators with the technology and experience to develop actionable connectivity with data ensures that profitable utilization seldom happens. Customer information remains a fragmented and vastly underutilized resource.

SUMMARY AND DETAILED DESCRIPTION

The technology functions as an information integrator; a service provider offering infrastructure and unique application tools, combined with informed business oversight. The technology works with companies to collect information from their customers and prospects in their own terms. Then transforms this fragmented data into profitable opportunities and competitive advantages using technology and expertise. This technology enables integration capabilities across the entire spectrum (or some combination of integrated spectrums) of a company's customer interactions.

Figure 1:
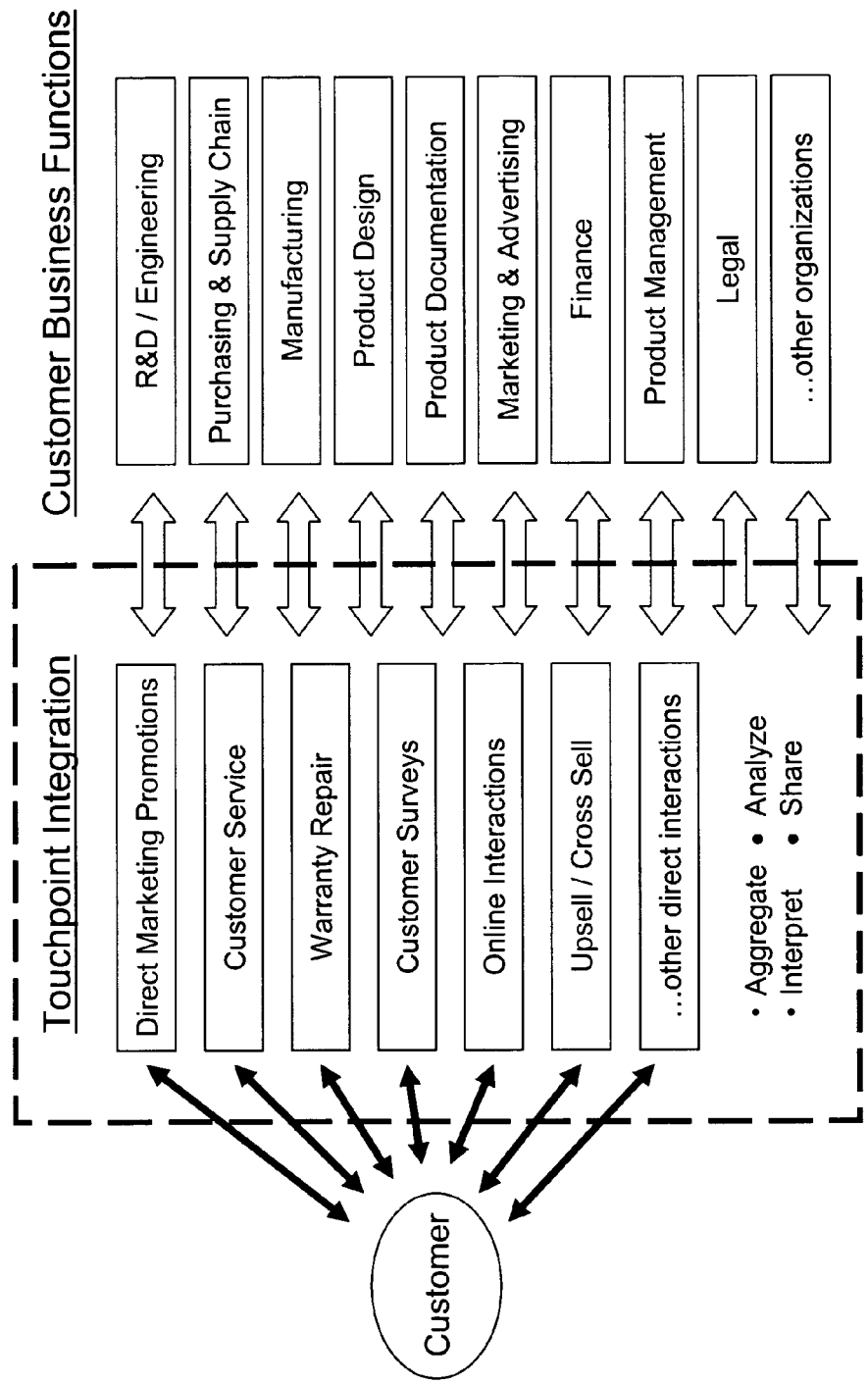
FIG. 1 is an information flow diagram illustrating the flow of information according to one exemplary implementation.

FIG. 1 illustrates the purposeful relationship between the interactions with the consumer of a business's goods or services and the various elements of that business through mechanisms which integrate these consumers' experiences into meaningful information for the business. This integration occurs using various data techniques which, for example, aggregate, analyze, interpret, and translate this information into useful forms of information, then made available to the entire business enterprise.

Traditionally, the customer interacts with a business through singular mechanisms which are related to only one Business Function. However the model described in FIG. 1 depicts a change to this traditional approach by adding an integrative function between the Customer and the Business Functions that derives more valuable information which is then available to all the Business Functions. Traditional integration of information is done as a reaction to customer situations while the described model is proactively integrating relevant information, enabling the Business Functions to be proactively manage the business and their activities.

The Integration Mechanism is placed between the Customer and the Business Functions to, e.g., allow for a consistent and unbiased treatment of customer information. Focusing on deriving information from the broadest view of all customer interactions may allow for one or more of the truest holistic view of the business's performance in the market, more rapid adaptations to trends or issues, and assessment of customer identification and comprehension of their needs. There are opportunities to gain partial insight from subsets of this arrangement. For example, focusing on integrating Customer Surveys, Warranty Claims, and Customer Service interactions will give a limited view of the quality performance but may not necessarily give insight into the competitive performance. Other subsets similar to this example can be derived and will deliver a limited view as compared to the integration of all available customer interactions.

The customer of the goods or services is any stakeholder in the business that is a part of the value chain and their experience is an important element in the success or failure of the business; e.g. consumer, supplier, retail, servicer, buyer, etc. As these stakeholders drive diverse interactions with the business, the integrative mechanism focuses on placing the data from the various interactions into common, relatable database.

The Business Functions illustrated in FIG. 1 are associated with a consumable good; however the concept presented can be used against service goods by substituting the appropriate Business Functions required for delivering these goods. Key areas of interest for each of the illustrative Business Function include: R&D/Engineering creates the technology required to produce the good and are interested in the performance of their products in the marketplace; Purchasing & Supply Chain are related to demand and quality performance; Manufacturing is focused on feature performance and quality of their activities; Product Design needs information on the performance, safety, and consumer feature preference; Product Documentation needs feedback on the consumer understanding of the product's use and care; Marketing & Advertising need to understand product performance against consumer expectations, impact of communication campaigns, and product awareness; Finance monitors the business performance and demand/sales trends, and market liabilities; Product Management is the broadest role and has interest in all areas mentioned plus has the responsibility for future growth of the business; and Legal is looking for market liabilities, safety concerns, and class action issues related to unfilled marketplace promises.

Figure 2:
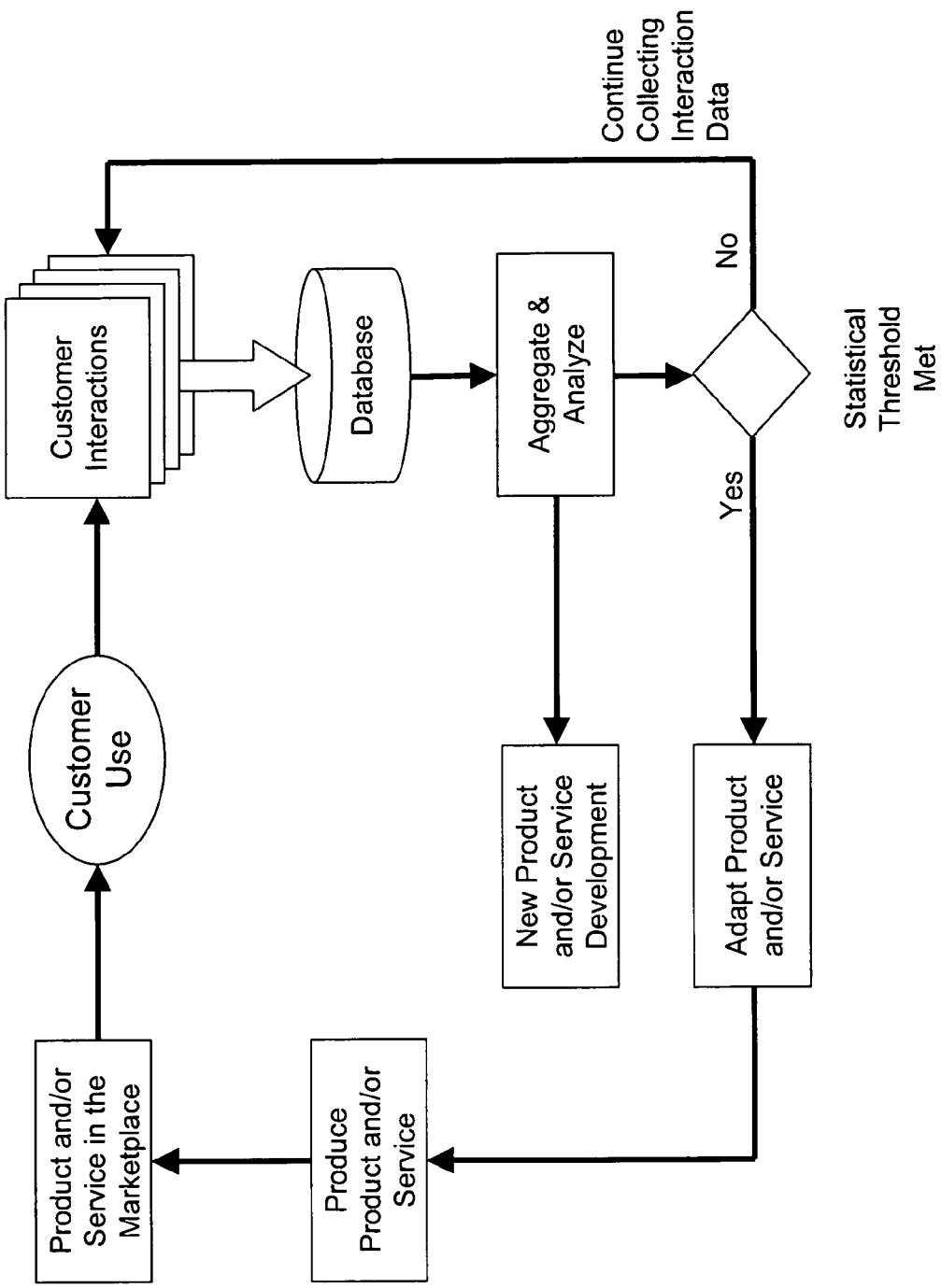
FIG. 2 is an adaptive service concept diagram illustrating the manner in which service is provided in an adaptive manner based upon information collected regarding customer service and other user interactions, on an individual and/or community basis.

FIG. 2 is a representative illustration of a process flow indicating how the Integration Mechanism of FIG. 1 may be configured to operate. The Integration Mechanism takes Customer interactions (i.e., touchpoints or opportunities to gather data with customers as described for FIG. 1) into a relational database to enable the identification of meaningful information. The result allows companies to develop proactive market information and place the customer knowledge of the whole organization in the hands of each decision maker. The result of which combines and transforms fragmented data into connected opportunities and competitive advantages.

The originating point for all information occurs during the Customer Use experience. Information is gathered through every analyzed Customer Interaction and integrated into a Database. This data is then Aggregated and Analyzed for useful information and trends. If that information meets a Statistical Threshold or meaningful level of significant difference than expectations, an Adaptation of the Product or Service is triggered. Those changes are then Produced and introduced into Marketplace for Customer Use, thus completing the learning cycle. Finally, Analysis can be utilized for optimizing the development and introduction of new product offerings. As in FIG. 1, this example may be centered on a business's goods but is applicable to service delivery as well.

Customer Use is described as the experience any stakeholder that is a part of the value chain and their experience with the business, also described for FIG. 1; e.g. consumer, supplier, retail, servicer, buyer, etc. Customer Interactions range from goods or services experience, promotions, warranty repairs, customer service, product registration, billing, payment, or any other method of interactions while conducting business. Capturing and storing data during these interactions including the purposeful feedback is stored in a relational database. This database may take on many forms and architectures while its purpose is to enable the derivation of useful information to the business through ongoing and ad hoc Aggregation and Analysis. The Analysis is designed to deliver key metrics and important indicators for tracking and progressing customer satisfaction and ultimately business success. The Analysis is also an important resource for new Product or Service Offering development, ensuring the most relevant information from current and past market experience is influencing future performance. If a trend is found to be above or below expected levels, a trigger can be met that initiates a proactive Adaptation of the Current Product to correct for poor performance or accelerate unexpected gains. The Adapted Product is introduced to production and ultimately launched into the Marketplace. The impact of these Adaptations can be easily tracked using the same Integration Mechanism.

This technology may (or may not) result in one or more of the following:

Enable a company to uncover and measure value generation across its entire business—and place more complete and useful customer knowledge within the hands of each decision maker.

Offer three levels of service—beginning with handling a company's Base Services (Call Centers, Warranty Claims, Web Site Services, etc.) and managing them to obtain more meaningful information to lower service costs and build customer loyalty. This technology also allows for Enhancing Services, which connect and leverage multiple customer functions to improve upselling and cross-unit selling. Additionally, or alternatively, this technology may include Transformational Services, which enable an entire organization, using a Knowledge-based toolset, to better understand its customers. Combined, these services can enable better performance in all aspects of product and service development and enhancement of its brands in the marketplace.

Provide services based on fees proportional to the business improvement delivered. This approach is based on clear performance metrics focusing on the impact of integrative services to both client's top and bottom line.

The market for this service is worldwide and across a broad product base. Initial targets include companies that concentrate on offering innovative products rather than providing service, those where the cost of acquiring and retaining customers is high, those where industry changes are driving new go-to-market models, and those in which customer service will be a key differentiator for enabling growth.

For them, this technology will provide a scaleable and flexible infrastructure. Providing integrated information analysis and metrics, best-in-class eBusiness services, and program management at various levels.

The following illustrate various aspects of the technology:

Executive Summary

Customer information is an underutilized, 'cost-focused', poorly-managed resource.

This technology will provide a 'profit-based' approach to collecting, managing, and linking customer information—enabling companies to use it as a strategic advantage for growth.

No comparable 'customer information integrator' exists.

Every company that collects customer data is a customer.

The Need for Customer Focus.

In a 'world' of shorter product life-cycles, higher prices for innovation, lower tolerance for failure, and increasingly demanding customers. Customer understanding is key to lowering costs for customer acquisition, developing, marketing, delivering successful offerings, providing satisfying 'personalized experience', and retaining, nurturing, growing profitable customer relationships.

Customer Information is Wasted.

Today's customer information is an under-valued and under-utilized resource.

Information Capture: minimize costs, meet requirements.

Information Storage: file until needed.

Information Management: use only for specific purposes.

Information Integration: connect within department.

Information Distribution: circulate on FYI basis.

Information Use: answer specific questions or needs.

Why is customer information handled this way?

Lack of skills: companies lack internal integration expertise,

Lack of pressure: 'companies' not 'customers' have been in control,

Lack of support: incentives encourage cutting costs for data collection, minimizing data use, Lack of understanding: companies don't 'see' that customer information should 'create' money, not 'cost' money, Lack of internal commitment: information technology is expensive, rapidly advancing, and requires sizable investment, and/or Lack of external information integrators with size, scope, plan, experience:

Specialized Outsourcing Firms (3PL—Reverse Logistics, Warranty Management, Global Teleservices) provide specific functional services, not data leverage and connection, and Large Consultants (IBM, Accenture) are concentrating on redesigning entire business entities and reengineering broad business process.

Creating Value from Customer Information.

Imagine a situation where information functions move from a center of cost to a center of profit:

Information Capture: more complete and designed for multiple purposes,

Information Storage: designed for frequent and easy access,

Information Management: active, with clear metrics, comprehensive analysis,

Information Integration: organization-wide, internal and external data connected for analysis and competitive advantage, Information Distribution: regular, active, with clear sense of purpose, and/or Information Use: fundamental building block for innovation and customer relationship management.

This technology includes unique tools, infrastructure, and expertise to:

Manage—for higher efficiency and more widespread usefulness—a company's individual functions involved with all aspects of customer information, Integrate—using a company's channels and processes—the collected information into a more effective and efficient basis for decision making in all parts of a company's business, and Enable—companies to use customer information as a resource to: Develop clearer directions for product/service development, lower costs for market differentiation, increase customer retention rates, and grow future profits.

For example, Tables 1 and 2 illustrate aspects of Product failure covered by Warranty handled through Online or Call Center consumer interactions.

TABLE 1

Companies Today

| Interaction | Information Collected | Business Benefit |
|---|---|---|
| Call Center | Failure Cause/ Product Data/ Customer Data | Product Grp: Minimized Costs of Call Center |
| Warrant Execution | Cost to Repair/ Service Quality | Product Grp: Minimized Repair or Replacement Costs |
| Post Repair Service Contract Sale & Cross Sell Satisfaction Survey | | |

TABLE 2

An Exemplary Approach Utilizing This Technology

| Information Collected | Business Benefit |
|---|---|
| Failure Cause/Product Data/Customer Data/Use & Behavior Data/User Guide Feedback/Online Use Data Materials/Avg Cost to Repair/First Time Resolution/Genealogy/ Design vs Mfg Data/ Cycletime of Repair/ Technical Doc Quality/ Service Quality Risk Mitigation vs Feature Data/ Consumer Behavior Data/ Complementary Product Data Process Effectiveness/ Feature Benefit/ Future Mkg Opt-in/ | Product Grp: Ongoing Business Research/Optimized User Guide, Product Design, & User Interface Product Grp: Optimized Product Costs/Optimized Repair - Replacement Costs/Servicer Benchmarking Engineering & Mfg: Lower Cost of Quality Product Grp: New Revenue/Margin, Portfolio Optimization/Ongoing Business Research Product Grp: Optimized Warranty Costs, Ongoing Business Research, Mktg: Dynamic Targeted Promotion Database |

This technology will offer:

Performance-based Agreements: companies will pay based on achieving business-building metrics, with no upfront investment, and Multiple Levels of Service, including:

Basic Services: comprehensive package of ala carte services to enable companies to obtain more actionable information and improve the efficiency and effectiveness of all data-driven functions, Enhanced Services: unique integration of Base Services connecting and leveraging multiple functions to create profitable new value for companies by enhancing the consumers' product/brand experience, and Transformational Services: based on integrated consumer experience and interaction, these services enable an entire organization to better understand its customers in ways that lead to better performance in all aspects of product and service development and delivery.

From a Customer's point of view, this technology:

Is consistent with current trends to out-source non-core functions and the next step of outsourcing models creating value versus just cost reduction, Protects companies against investing scarce resources in under-utilized technology, Changes information collection and handling from a 'cost center' to a 'profit center' where service costs are paid from improved business performance, Enables companies to collect more useful data, to manage it more effectively, and to use it more productively to lower internal costs and enhance customer loyalty and market success, and/or Enables companies to migrate to increased services and more sophisticated tools based on their needs.

This technology provides a unique information integrator with a widespread, broad customer base potential, managed by proven eBusiness leaders, in a competitive landscape where no other company offers the solution this technology provides. As such, it:

Meets a vast, un-served market—too small for broad business transformation companies and too complex for specialized outsourcing firms, Leverages a limited number of core applications—across a wide range of customers—providing immediate and extensive economies of scale, Is based on a relationship business model—which involves long-term customer agreements for upgrades and significant barriers to exit, Has an extensive 'initial customer target base'—directed at companies compelled by rapid product innovation, where customer acquisition costs are high, industry changes are forcing new go-to-market models, and information technology is fundamental to growth, and Is based on a strong financial model and business plan—with clear definition of the services provided and acquisitions required.

Operations are based on one or more of the following interdependent functional pillars:

Knowledgebase Management, for example:
Rules Protocol Competency,
Database Competency,
Digital Asset Management, and
Information Service Competency;
Call Center Management, for example:
Outsourcing Competency,
Metrics Competency, and
Upsell/Cross Sell Execution;
Fulfillment, for example:
Warehousing and Inventory Management,
Order Management,
Physical Operations Competency, and
Carrier Relationship Management;
eBusiness Platforms, for example:
Web Tool Development and Execution,
Online Commerce,
Online Customer Service,
eMail Competency, and
EDI/EAI Competency; and
Marketing Services, for example:
Business Research,
Online Branding,
Online/Offline Promotion,
IP Mapping/Competitive Intelligence, and
Feature/Benefit Analysis.

Figure 3:
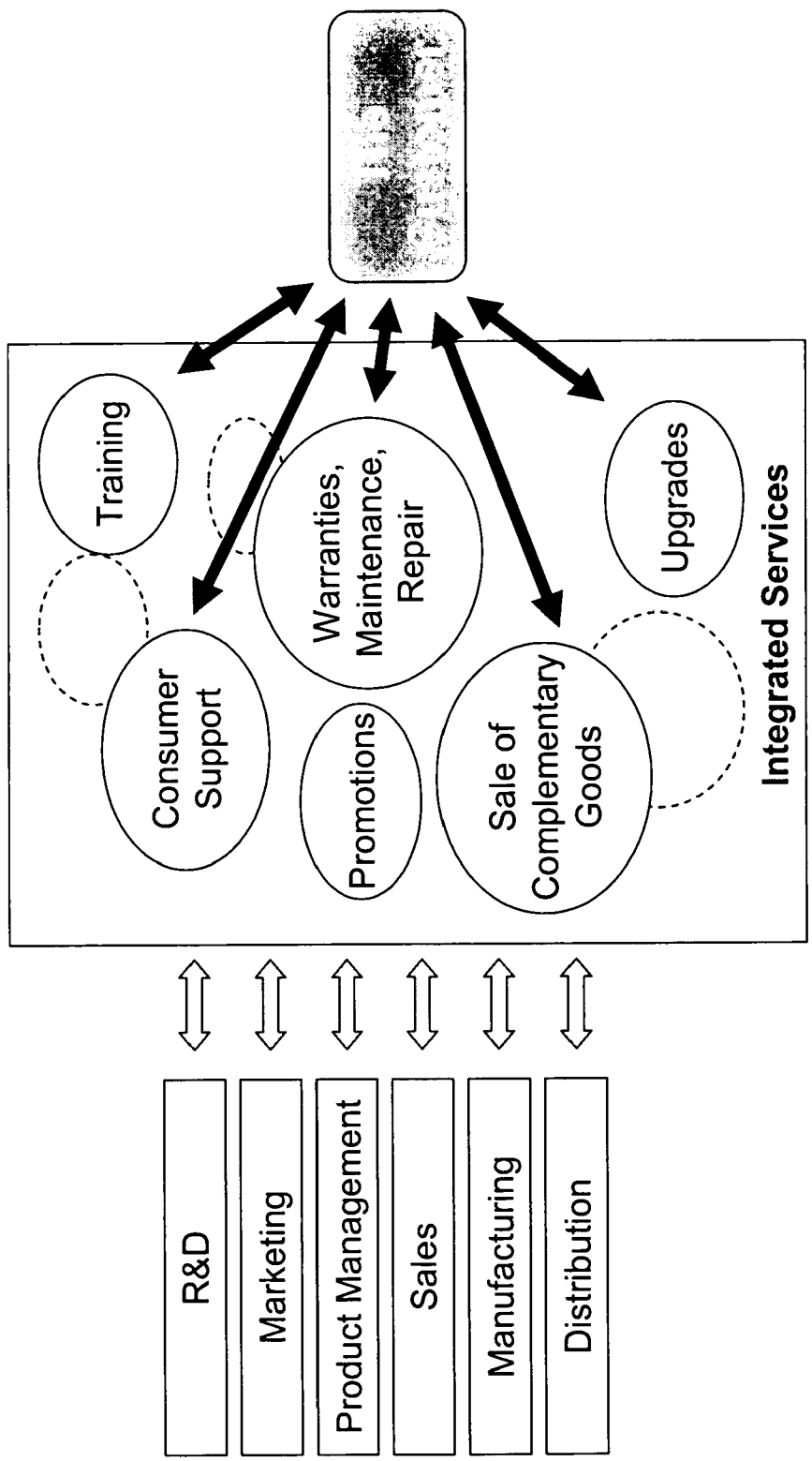
FIG. 3 illustrates the utility of this technology in managing customer-interactive functions, gathering and integrating customer information, putting it into a business context, and enabling a company to use all the information as a resource for generating present and future business value.

FIG. 3 illustrates the utility of this technology in managing customer-interactive functions, gathering and integrating customer information, putting it into a business context, and enabling a company to use all the information as a resource for generating present and future business value.

In one example, for instance, more complete customer information is collected and will be managed to obtain a strategic advantage. Table 3 illustrates:

TABLE 3

| Warranty Card Information Collected | Company Approach | Exemplary Approach Applying This Technology |
|---|---|---|
| Name/Address | Filed | Used for direct mail offers |
| Price Paid | Filed | Used by Pricing for competitive analysis |
| Other Items Owned | Filed | Used by Sales for special offers |
| Sources of Product information | Filed | Used by Marketing for future Ad placement decisions |
| Product Features Preferred | Not Asked | Used by R&D for future product planning |
| Brand Attributes | Not Asked | Used by Product Management for 'line extensions' |
| Product Understanding | Not Asked | Used by Training for special course offers |

Consumer/customer landscape & expectations are changing as fast or faster than the shortening product life cycle. Integrated customer understanding throughout the organization is essential in ensuring company product offerings are current and relevant. This is another force of the business that is yet to be recognized by most (think about Thomson and Kodak from this perspective—one shot business research versus continuous consumer understanding). Also a trend of soft products (upgradeable as feature taste or needs change).

The phenomenon of moving to Service differentiation is driven by two elements. Feature Neutralization driven by shortened product life cycles and pricing pressures driven by the global open marketplace (polite way of saying labor chasing). The only other available differentiator is service (which now becomes synonymous with brand value). A company has two choices when caught by the narrowing of significant feature advantages and comes under price pressure 1) become a commodity and fight on price, or 2) take the high road and differentiate on service and affinity around the brand to maintain pricing and margin position.

Outline:
The Support Services Opportunity is Large (Market Assumptions & Key Drivers),
The Integrated Model (Service Value Creation), and
Strategies for Competing (Targets, Competitive Landscape, Gaps).

At the same time additional market forces are converging, dramatically altering traditional competitive economics.

Service Becomes Key Differentiator
First in High-end Products
e.g. Onstar evolution
Shorter Life Cycle
Driven by technology push & the marketing evolution
Newer products with better features are cheaper
Higher Development Costs that Gain Less Differentiation
Volume is king
Cost is a Killer
Chess Game for IP
Limited Break-through Technologies
Fencing & Application Silos These challenges are causing every Product leader to transform itself as a Service company.

Companies must rethink the newly evolving fused relationship between strategy and support services, as illustrated by Table 4:

TABLE 4

| Issue | Business Implications |
|---|---|
| Changing Business Requirements | Customers are demanding improved service, access to a full set of products and services and multi-channel "high touch" interaction, requiring cross-enterprise optimization of capabilities, assets (e.g. infrastructure), and relationships. Reduced revenue growth, due to current economic slow down, is putting pressure on margins and overall cost structures. |
| Rapid Technological Changes | There are high degrees of uncertainty as hardware and software capabilities change quickly Difficult to predict technology investments and the business/technology environment |
| Service Infrastructure Weaknesses | Existing processes do not reflect improvements in technology capabilities Complex enterprise systems create process integration (scale and scope) inefficiencies and information sharing difficulties |
| Organizational Challenges | Many firms still operate in autonomous silos making sharing of control and cross-organizational information sharing an issue Difficult to attract and retain necessary talent Increasing reliance on partners makes relationship building and maintenance an important capability |

And, execution challenges are forcing a re-evaluation of the impact of their current capabilities, as illustrated by Table 5:

TABLE 5

| Issue | Execution Implications |
| --- | --- |
| Changing Business Requirements | Process integration does not happen due to legacy system's inability for cross-enterprise optimization and rapid adaptation to changing customer needs Fundamental system changes must be done piece by piece, one business case at a time |
| Rapid Technological Changes | Processes and systems need constant upgrading, sometimes even before a project is complete Increased risk of significant technology development due to uncertainty associated with future technology capabilities |
| Service Infrastructure Weaknesses | Existing systems do not reflect improvements in technology capabilities Weak core competency in systems and e-business along with difficulties integrating enterprise systems is slowing change |
| Organizational Challenges | Cross-enterprise process integration is a challenge when business units are autonomous Process optimization and management is compromised due to lack of integration and e-business skills Being competent in all areas of support is difficult as technology complexity increases |

Figure 4:
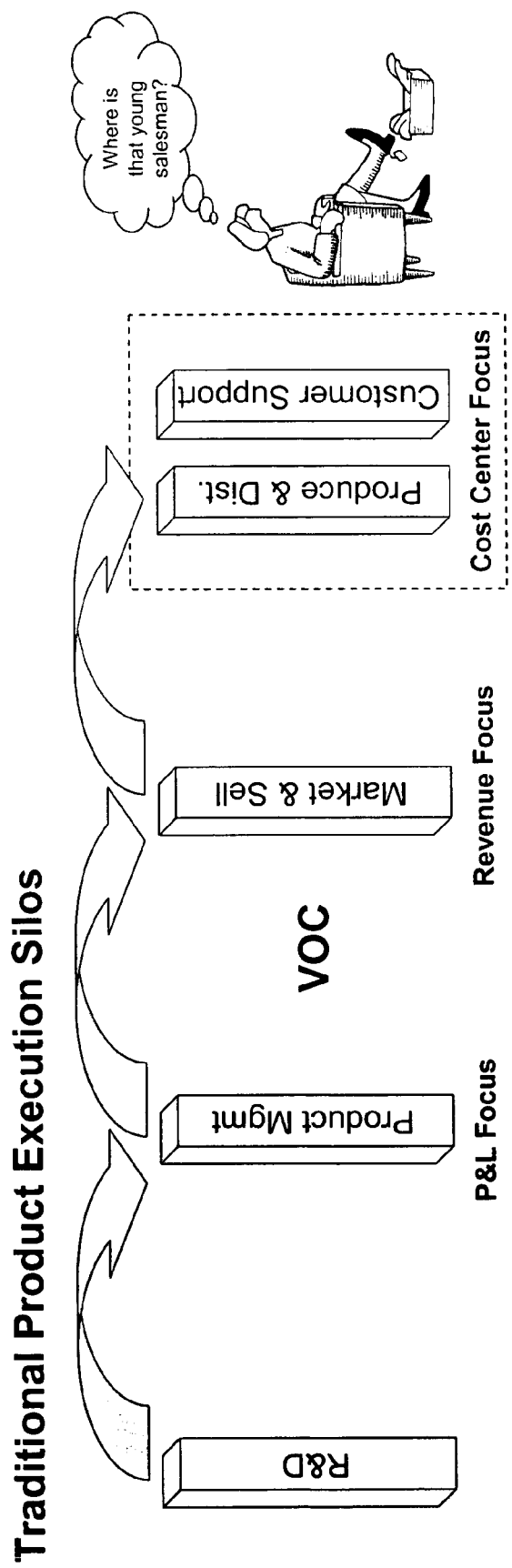
FIG. 4 illustrates the silo effect of conventional product support services.

As a consequence, product support services are cut-off from delivering their true value potential, as illustrated by FIG. 4.

As companies look toward the future, they cannot continue approaching support services in the traditional manner. Table 6 illustrates:

TABLE 6

| Pressure | Reaction | Need |
| --- | --- | --- |
| Support Services Not a Core Competency | Keep the fires under control Placate the consumer Manage the costs Hide from the consumer Chase low cost labor In most cases, if not all, Outsource so it becomes purely variable spend | A trusted partner to monitor changes in support services needs |
| High Costs of New System | Requires large capital investment No integrated data Sub-optimized Silos Sub-optimized Understanding | Deliver as much shared support services as needed when needed |
| Infrastructure Won't Scale | Key activities constrained Unforeseen capacity needs go unmet | A flexible, utility based model for delivering support services |
| Long Lead-times & Lack of Flexibility | Substantial learning curve problem Microsoft/Thomson/ IBM/Kodak datapoints | Business enablement through the delivery of support services |

Ultimately, there is substantial shareholder value hidden in servicing products that an integrated service approach can uncover. We have found that a company that institutes a first-rate service management capability can increase its service revenue by between 10 percent and 20 percent. Moreover, by making its service functions more efficient, a company can reduce operating expenses by 15 to 30 percent. Knowledge gained by the service organization, which is in constant contact with the company's customers, can be fed back into the manufacturing organization to help it make better products. Better products translate into a 10 percent to 20 percent reduction in warranty expenses. In addition, because there will be fewer faulty products sold, the company will not need to field-test as much equipment, which can help reduce capital expenditures by anywhere from 10 percent to 25 percent.

Therefore, the marketplace trends and business pressures may be capitalized by delivering major business improvement opportunities with new, integrated service strategies, infrastructures and tools—combined with informed business oversight.

Figure 5:
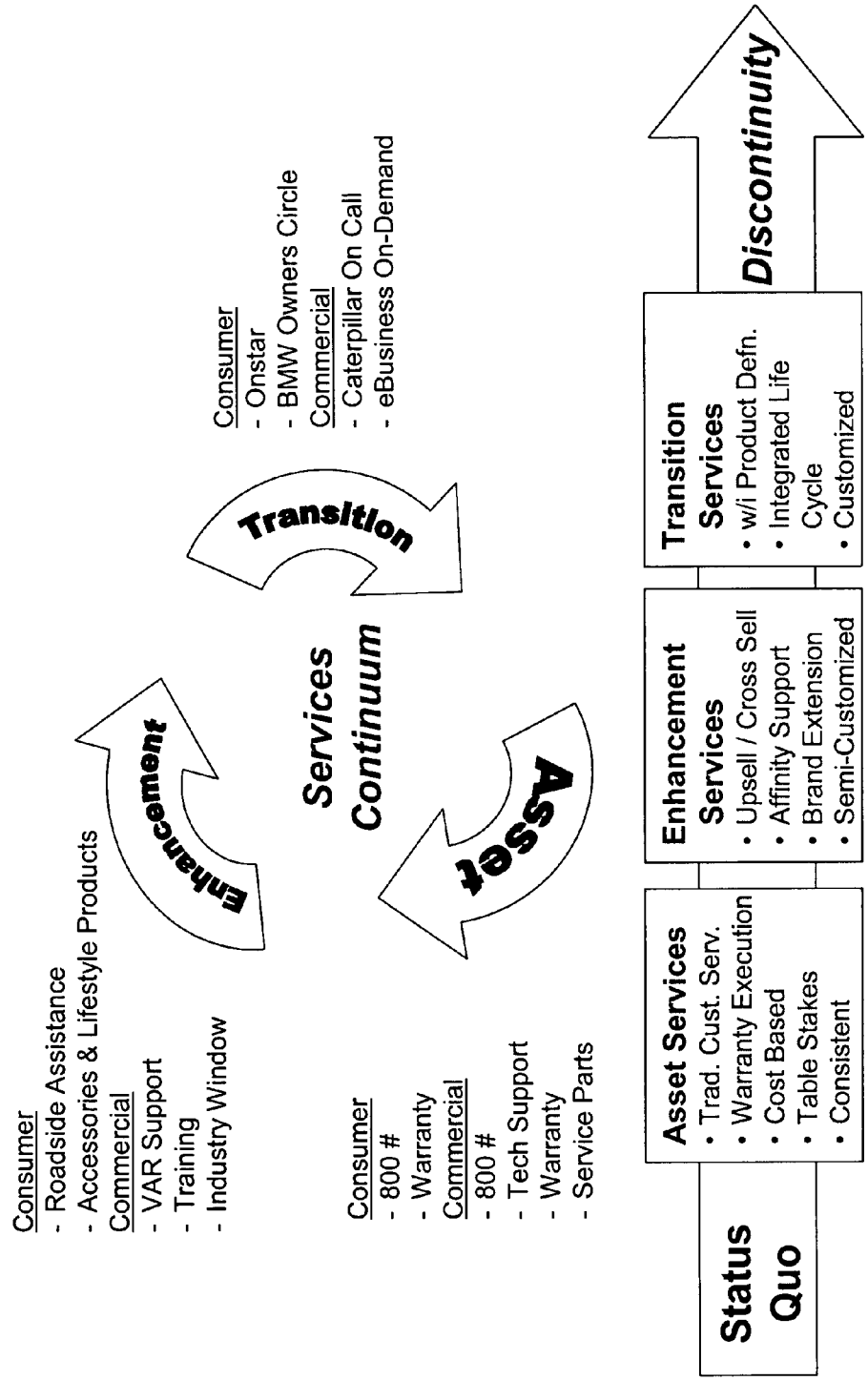
FIG. 5 illustrates an exemplary services product space under an integrated paradigm.

A vision of the services products space is illustrated by FIG. 5.

Figure 6:
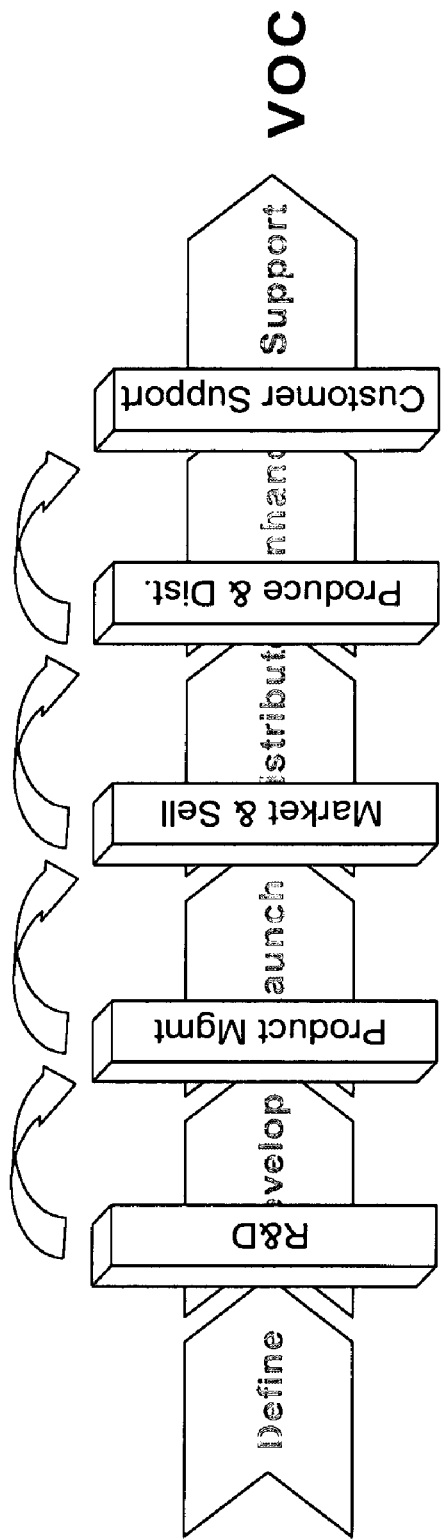
FIG. 6 illustrates delivery of discontinuous valve by an integrated customer view and investment standpoint.

Discontinuous value is delivered by an integrated customer view & investment standpoint, as illustrated by the Integrated Consumer Relationship Cycle depicted in FIG. 6.

This technology can be used to deliver infrastructure, applications, managed services, and business processes as a utility across the service-to-profit value chain. Aspects of the Integrated Consumer Relationship Cycle are described as follows:

Define
Bus. Rsrch.
Behavioral
Science
Feature/Benefit
Comp. Intel.
IP Mapping
Data Mining
Develop (R&D)
Bus. Rsrch.
Positioning
Focus Grps
IP Strategy
Branding
Launch (Product Mgmt.)
Mktg Plan
Promotions
Website
Online/Offline Adv
eMail Promo This model is different from current outsourcing infrastructure services at all levels, as illustrated by Table 7.

TABLE 7

|  | Definition |  | What makes it different? |
| --- | --- | --- | --- |
| Asset Services | Traditional customer service Warranty extension | Tactical | Outsource leverage of outsourcing Solution to basic silo business pressures |
| Enhancement Services | Upsell/Cross Sell Affinity Support Brand Extension | Strategic/ Transfor- mational | Efficient Revenue Generation integrated to all customer touchpoints Ability to direct market and enhance customer relationship |
| Transition Services | Product Definition Integrated Life Cycle |  | Shift to include service as explicit value proposition Continual understanding of evolving consumer perceptions |
| Know How | Comprehensive understanding of service issues and solutions Ability to synthesize this knowledge as a foundation for new services |  | Strong partner relationship between vendor and customer Relies heavily on deep knowledge of customer and technology issues |

The value of this model will be realized as companies maintain focus on the outcomes delivered by it's services, as illustrated by Table 8.

TABLE 8

|  | Discontinuous Advantages | Business Outcome |
|---|---|---|
| Pricing | Adoption of utility pricing that scales up and down, has substantially lower lead times | Cost Improvements Lower up-front capital costs |
| Flexibility/ Scalability | The ability to react to change in the marketplace and add new services more quickly than before | Reduction in: "soft costs", application and Integration costs, complexity, IT costs/customer, time to break-even, operating expenses, warranty expenses, etc. |
| Economies of Scale | Improved lead time for new products and services lower overall service costs to customers | |
| Operational Improvements | Maximize reliability and service levels of current services in addition to enabling focus of scarce resources on the highest value-ad internal activities | |
| Strategic | Immediate Access to an Integrated Competency leverage of broader experience base than internally possible access to modular services on demand Clear Value & Investment Oriented Service Delivery highlights differentiation & measurable value allows cost/benefit trade-offs | Revenue Improvements Increased serviced revenue and spend/customer Customer Retention Market Capture Revenue/employee New service offerings |
| Risk Migration | Enables customers to focus on their "core" business Closed Loop Product Development Cycle lowers launch risks shortens cycle-time | |

Figure 7:
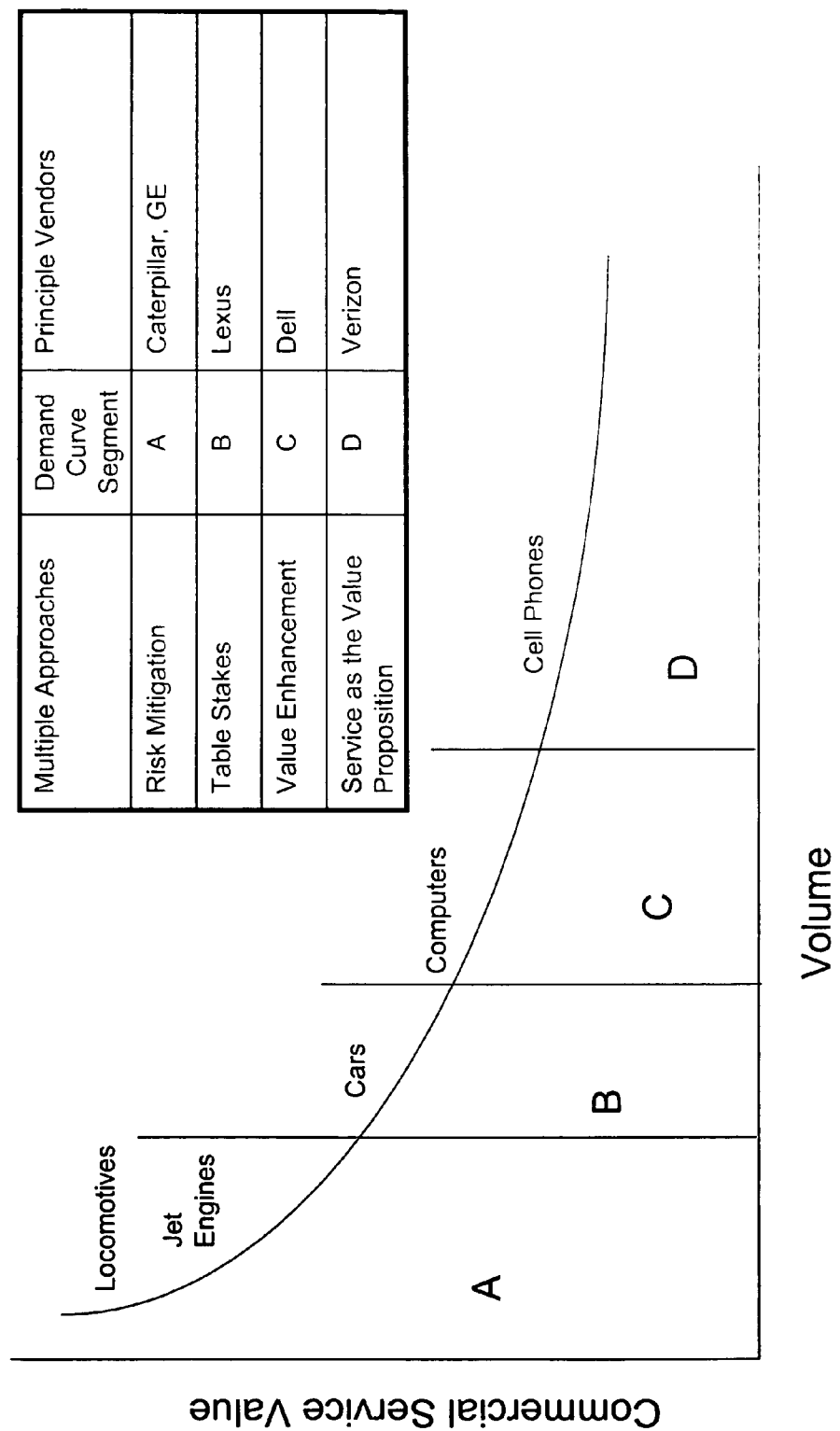
FIG. 7 illustrates the resultant migration of service differentiation.

The marketplace has shown the migration of service differentiation down the economic food chain, as illustrated by FIG. 7.

The competitive service landscape shows that the top Customer Care firms lack integration and are dependent on outsourcing key services.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of integrating user feedback, comprising:
receiving customer interaction data that describes customer interactions, of at least two users with a business, related to an implicated product/process offered by the business, wherein receiving the customer interaction data comprises receiving warranty claim data generated based on a warranty claim related to the implicated product/process and made by at least one of the users;
storing, in a database, the received customer interaction data that describes customer interactions of the users;
aggregating, by a processor, the customer interaction data that describes customer interactions of the users, wherein aggregating the customer interaction data comprises integrating the warranty claim data with other customer interaction data that is different than warranty claims;
analyzing the aggregated customer interaction data to identify the implicated product/process;
making at least a portion of the aggregated customer interaction data available to inspire changes in multiple, different parts within the business, the multiple, different parts within the business each performing a different business function related to the implicated product/process and including a product documentation part of the business;
determining whether the aggregated customer interaction data that describes customer interactions of the users reaches a threshold level with respect to one or more aspects of the implicated product/process identified;
if the threshold level is determined to have been reached,
identifying an aspect of the implicated product/process that is related to the aggregated customer interaction data, wherein identifying the aspect of the implicated product/process that is related to the aggregated customer interaction data comprises identifying a presentation aspect of an instruction book that is related to the aggregated customer interaction data; and
modifying the identified aspect of the product/process based on the aggregated customer interaction data, wherein modifying the identified aspect of the product/process comprises modifying, by the product documentation part of the business, the presentation aspect of an instruction book that is related to the aggregated customer interaction data; and
handling, through a call center consumer interaction, a product failure covered by warranty, the handling including:
based on a call center interaction related to the product failure covered by warranty, collecting call center interaction information that includes failure cause information, product data, customer data, use and behavior data, user guide feedback, and online use data;
using the collected call center interaction information to perform ongoing business research and to optimize a user guide, a product design, and a user interface related to the product failure covered by warranty;
based on a warranty execution interaction related to the product failure covered by warranty, collecting warranty execution interaction information that includes materials information, average cost to repair, first time resolution, genealogy, design versus manufacturing data, cycle time of repair, technical document quality information, and service quality information;
using the warranty execution interaction information to optimize product costs, to optimize repair and replacement costs, to perform service benchmarking, and to design a lower cost of quality;
based on a post repair service contract sale and cross sell interaction related to the product failure covered by warranty, collecting post repair service contract sale and cross sell interaction information that includes risk management versus feature data, consumer behavior data, and complementary product data;
using the post repair service contract sale and cross sell interaction information to generate new revenue, to perform margin portfolio optimization, and to perform ongoing business research;
based on a satisfaction survey interaction related to the product failure covered by warranty, collecting satisfaction survey interaction information that includes process effectiveness information, feature benefit information, and future marketing opt-in information; and using the satisfaction survey interaction information to optimize warranty costs, to perform ongoing business research, and to maintain a dynamic targeted promotion database.

2. The method of claim 1, wherein receiving customer interaction data includes receiving customer interaction data that describes interactions with a customer call center, receiving customer interaction data that describes interactions with a computer interface based on customer manipulation of a web page, and receiving electronic mail generated by the customers.

3. The method of claim 2, wherein the customer interaction data is received using a telephone interface at a customer call center.

4. The method of claim 2, wherein the customer interaction data is received using a computer interface based on customer manipulation of a web page.

5. The method of claim 4, wherein:
receiving the customer interaction data includes receiving customer manipulation of an online resource library.

6. The method of claim 5, wherein the online resource library is a help utility, manipulation by the customer of the help utility to obtain information concerning a product/process being received as customer feedback and analyzed to infer a need for modification to the product/process or documentation supporting the product/process.

7. The method of claim 2, wherein the customer interaction data includes electronic mail generated by the customers.

8. The method of claim 2, wherein the customer interaction data includes more than one of feedback received using a telephone interface at a customer call center, feedback received using a computer interface based on customer manipulation of a web page, and electronic mail generated by the customers.

9. The method of claim 1, wherein the customer interaction data includes information related to one or more of sales force feedback, competitive analysis, and training feedback.

10. The method of claim 9, wherein the competitive analysis includes analysis of competitor service or product manuals.

11. The method of claim 1, wherein the customer interaction data includes information related to sales force feedback, competitive analysis, and training feedback.

12. The method of claim 1, wherein the customer interaction data is received by a party who buys, makes, and/or sells the implicated product/process commercially available to the customers.

13. The method of claim 1, wherein the customer interaction data is received by a party other than the party who makes the implicated product/process commercially available to the customers.

14. The method of claim 1, wherein the customer interaction data includes feedback that is critical of the implicated product/process.

15. The method of claim 1, wherein the customer interaction data includes feedback that is complementary of the implicated product/process.

16. The method of claim 1, wherein modifying the presentation aspect of the instruction book comprises removing, from the instruction book, terminology identified by the customer interaction data.

17. The method of claim 1, wherein modifying the presentation aspect of the instruction book comprises changing presentation of topics or ideas in the instruction book.

18. The method of claim 17, wherein changing presentation of topics or ideas in the instruction book comprises changing an order of presentation.

19. The method of claim 1, wherein the instruction book includes a printed or electronic manual.

20. The method of claim 19, wherein the instruction book includes an electronic manual that is accessible using the Internet.

21. The method of claim 20, wherein the electronic manual includes an online help utility.

22. The method of claim 1, wherein the instruction book includes an online troubleshooting utility.

23. The method of claim 22, wherein the instruction book includes a service manual.

24. The method of claim 1, wherein modifying the presentation aspect of the instruction book comprises removing, from the instruction book, terminology identified by the customer interaction data.

25. The method of claim 24, wherein modifying the presentation aspect of the instruction book comprises changing presentation of topics or ideas in the instruction book.

26. The method of claim 25, wherein changing presentation of topics or ideas in the instruction book comprises changing an order of presentation.

27. The method of claim 1, wherein the implicated product/process with respect to which customer interaction data is received is a superset that includes the aspect that is identified as being related to the customer interaction data and that is modified based on the customer interaction data.

28. The method of claim 1, wherein the identified aspect includes a product user interface for the implicated product/process with respect to which customer interaction data is received.

29. The method of claim 1, wherein the implicated product/process with respect to which customer interaction data is received includes a manufacturing process.

30. The method of claim 29, wherein the customer interaction data includes feedback generated at least in part from materials data.

31. The method of claim 1, wherein one or more feature sets of the implicated product/process are identified as aspects related to the aggregated customer interaction data, and wherein the identified feature sets are modified based on the aggregated customer interaction data.

32. The method of claim 1, wherein new feature sets of the implicated product/process are identified as aspects related to the aggregated customer interaction data, and wherein the identified new feature sets are added based on the aggregated customer interaction data.

33. The method of claim 1, further comprising:
aggregating feedback received from the users with respect to more than one type of related product/process and comparing the aggregated feedback against the threshold level to determine whether the threshold level is reached, and
identifying a feature common to the more than one type of related product/process as the aspect of the implicated product/process related to the aggregated feedback.

34. The method of claim 33, wherein the feature includes a single instruction book common to the more than one type of related product/process.

35. The method of claim 33, wherein the feature includes a portion of an instruction book that is common among the instruction books for each of the product/process.

36. The method of claim 33, wherein the feature includes a component that is common among each of the related types of product/process.

37. The method of claim 1, further comprising
aggregating feedback received from the users in different but related product segments with respect to more than one related product/process and comparing the aggregated feedback against the threshold level to determine whether the threshold level is reached, and identifying a feature common to the more than one related product/process as the aspect of the implicated product/process related to the aggregated feedback.

38. The method of claim 37, wherein feedback received from users in one segment is used as a basis for modifying features of product/process offered to users in a related but different segment.

39. The method of claim 1, further comprising determining which of several different threshold levels are reached by the aggregated feedback received from the users, and modifying the identified aspect of the product/process differently based on the threshold level determined to have been reached.

40. The method of claim 39, wherein satisfaction of the different threshold levels is at least partially dependent upon context.

41. The method of claim 40, wherein the context is used to attribute significance to particular users relative to other users.

42. The method of claim 1, wherein the product/process has at least two versions, the feedback being received with respect to a relatively early or immature version and the modifications being made to a later or more mature version.

43. The method of claim 1, wherein the product/process is a process with linear subcomponents, where feedback with respect to a downstream subcomponent of the process is used as a basis for modifying an upstream subcomponent of the process.

44. The method of claim 1, wherein feedback from users of one demographic or market segment is used as a basis for modifying the product/process used by or sold to users of other demographics or market segments.

45. The method of claim 1 wherein the implicated product/process is an implicated product and making at least a portion of the aggregated customer interaction data available to inspire changes in multiple, different parts within the business comprises making at least a portion of the aggregated customer interaction data available to inspire changes in a research and development/engineering part of the business that creates technology required to produce the implicated product, a purchasing and supply chain part of the business that is related to demand and quality performance of the implicated product, a manufacturing part of the business that is focused on feature performance and quality of their activities related to the implicated product, a product design part of the business that is related to performance, safety, and consumer feature preference of the implicated product, a product documentation part of the business that evaluates consumer understanding of the implicated product's use and care, a marketing and advertising part of the business related to product performance against consumer expectations, impact of communication campaigns, and product awareness for the implicated product, a finance part of the business that monitors business performance and demand/sales trends, and market liabilities for the implicated product, a product management part of the business that has responsibility for future growth of the business, and a legal part of the business that considers market liabilities, safety concerns, and class action issues related to the implicated product.

46. The method of claim 1 wherein integrating the warranty claim data with other customer interaction data that is different than warranty claims comprises integrating the warranty claim data with other direct customer interaction data that describes other direct user interactions with the business receiving the warranty claim data that are not related to warranty claims.

47. The method of claim 1
wherein receiving warranty claim data generated based on a warranty claim related to the implicated product/process and made by at least one of the users comprises receiving the warranty claim data through a first singular mechanism that is related to only a warranty claim business function;

wherein receiving customer interaction data further comprises receiving the other customer interaction data through a second singular mechanism that is related to only a second business function, the first singular mechanism being different than the second singular mechanism and the warranty claim business function being different than the second business function; and wherein integrating the warranty claim data with the other customer interaction data that is different than warranty claims comprises integrating the warranty claim data received through the first singular mechanism with the other customer interaction data received through the second singular mechanism to combine fragmented data into connected opportunities.

48. The method of claim 1, further comprising:
based on call center interactions related to warranty claims for the implicated product/process, collecting call center interaction information that includes failure cause information, product data, customer data, use and behavior data, user guide feedback, and online use data; and
integrating the call center interaction information with the aggregated customer interaction data;
determining whether the aggregated customer interaction data reaches a threshold level with respect to a user guide for the implicated product/process; and
based on a determination that the aggregated customer interaction data reaches a threshold level with respect to the user guide for the implicated product/process, triggering a process to optimize the user guide for the implicated product/process.

49. The method of claim 1, further comprising:
based on warranty execution related to warranty claims for the implicated product/process, collecting warranty execution interaction information that includes materials information, average cost to repair, first time resolution, genealogy, design versus manufacturing data, cycle time of repair, technical document quality information, and service quality information; and
integrating the warranty execution interaction information with the aggregated customer interaction data;
determining whether the aggregated customer interaction data reaches a threshold level with respect to at least one cost for the implicated product/process; and
based on a determination that the aggregated customer interaction data reaches a threshold level with respect to the at least one cost for the implicated product/process:
triggering a product group part of the business to perform a process to optimize product costs and repair and replacement costs for the implicated product/process; and
triggering an engineering and marketing part of the business to perform a process to lower cost of quality for the implicated product/process.

50. The method of claim 1, further comprising:
based on post repair service contract sale and cross sell interactions related to warranty claims for the implicated product/process, collecting post repair service contract sale and cross sell interaction information that includes risk management versus feature data, consumer behavior data, and complementary product data; and integrating the post repair service contract sale and cross sell interaction information with the aggregated customer interaction data;

determining whether the aggregated customer interaction data reaches a threshold level with respect to potential new revenue for the implicated product/process; and based on a determination that the aggregated customer interaction data reaches a threshold level with respect to potential new revenue for the implicated product/process, triggering a process to generate new revenue for the implicated product/process.

51. The method of claim 1, further comprising:

based on satisfaction survey interactions related to warranty claims for the implicated product/process, collecting satisfaction survey interaction information that includes process effectiveness information, feature benefit information, and future marketing opt-in information; and integrating the satisfaction survey interaction information with the aggregated customer interaction data;

determining whether the aggregated customer interaction data reaches a threshold level with respect to warranty costs for the implicated product/process;

based on a determination that the aggregated customer interaction data reaches a threshold level with respect to the warranty costs for the implicated product/process, triggering a product group part of the business to perform a process to optimize warranty costs for the implicated product/process; and storing the satisfaction survey interaction information in a dynamic targeted promotion database maintained by a marketing part of the business.

52. A method of integrating user feedback, comprising:

receiving customer interaction data that describes customer interactions, of at least two users with a business, related to an implicated product/process offered by the business, wherein receiving the customer interaction data comprises receiving customer interaction data related to quality performance for the implicated product/process and receiving customer interaction data related to competitive performance for the implicated product/process;

storing, in a database, the received customer interaction data that describes customer interactions of the users;

aggregating, by a processor, the customer interaction data that describes customer interactions of the users, wherein aggregating the customer interaction data comprises integrating the customer interaction data related to quality performance for the implicated product/process with the customer interaction data related to competitive performance for the implicated product/process;

analyzing the aggregated customer interaction data to identify a trend for the implicated product/process;

determining whether the identified trend for the implicated product/process is above or below expected levels with respect to one or more aspects of the implicated product/process;

if the identified trend for the implicated product/process is determined to be below expected levels,
modifying at least one aspect of the product/process to correct for poor performance based on the aggregated customer interaction data; and if the identified trend for the implicated product/process is determined to be above expected levels, modifying at least one aspect of the product/process to accelerate unexpected gains based on the aggregated customer interaction data; and handling, through a call center consumer interaction, a product failure covered by warranty, the handling including:

based on a call center interaction related to the product failure covered by warranty, collecting call center interaction information that includes failure cause information, product data, customer data, use and behavior data, user guide feedback, and online use data;

using the collected call center interaction information to perform ongoing business research and to optimize a user guide, a product design, and a user interface related to the product failure covered by warranty;

based on a warranty execution interaction related to the product failure covered by warranty, collecting warranty execution interaction information that includes materials information, average cost to repair, first time resolution, genealogy, design versus manufacturing data, cycle time of repair, technical document quality information, and service quality information;

using the warranty execution interaction information to optimize product costs, to optimize repair and replacement costs, to perform service benchmarking, and to design a lower cost of quality;

based on a post repair service contract sale and cross sell interaction related to the product failure covered by warranty, collecting post repair service contract sale and cross sell interaction information that includes risk management versus feature data, consumer behavior data, and complementary product data;

using the post repair service contract sale and cross sell interaction information to generate new revenue, to perform margin portfolio optimization, and to perform ongoing business research;

based on a satisfaction survey interaction related to the product failure covered by warranty, collecting satisfaction survey interaction information that includes process effectiveness information, feature benefit information, and future marketing opt-in information; and using the satisfaction survey interaction information to optimize warranty costs, to perform ongoing business research, and to maintain a dynamic targeted promotion database.

53. The method of claim 52:

wherein receiving customer interaction data comprises:
receiving customer survey data related to the implicated product/process and made by at least one of the users; and
receiving customer service data that describes customer service interactions related to the implicated product/process for at least one of the users;

wherein integrating the customer interaction data related to quality performance for the implicated product/process with the customer interaction data related to competitive performance for the implicated product/process comprises integrating warranty claim data with the customer survey data and the customer service data;

wherein analyzing the aggregated customer interaction data to identify a trend for the implicated product/process comprises analyzing the integrated warranty claim, customer survey, and customer service data; and wherein determining whether the identified trend for the implicated product/process is above or below expected levels with respect to one or more aspects of the implicated product/process comprises determining whether the integrated warranty claim, customer survey, and customer service data reaches a threshold level with respect to one or more aspects of the implicated product/process.

54. The method of claim 52:
wherein receiving customer interaction data comprises receiving call center data that describes call center interactions related to the implicated product/process for at least one of the users;
wherein integrating the customer interaction data related to quality performance for the implicated product/process with the customer interaction data related to competitive performance for the implicated product/process comprises integrating warranty claim data with the call center data;
wherein analyzing the aggregated customer interaction data to identify a trend for the implicated product/process comprises analyzing the integrated warranty claim and call center data; and
wherein determining whether the identified trend for the implicated product/process is above or below expected levels with respect to one or more aspects of the implicated product/process comprises determining whether the integrated warranty claim and call center data reaches a threshold level with respect to one or more aspects of the implicated product/process.

55. The method of claim 52, further comprising tracking an impact of modifications made to the implicated product/process using an integration mechanism used to integrate the customer interaction data related to quality performance for the implicated product/process with the customer interaction data related to competitive performance for the implicated product/process.

56. A method of integrating user feedback, comprising:
receiving customer interaction data that describes customer interactions, of at least two users with a business, related to an implicated product/process offered by the business;
storing, in a database, the received customer interaction data that describes customer interactions of the users;
aggregating, by a processor, the customer interaction data that describes customer interactions of the users;
analyzing the aggregated customer interaction data to identify the implicated product/process;
determining whether the aggregated customer interaction data that describes customer interactions of the users reaches a threshold level with respect to one or more aspects of the implicated product/process identified; and
if the threshold level is determined to have been reached, identifying an aspect of the implicated product/process that is related to the aggregated customer interaction data; and
modifying the identified aspect of the product/process based on the aggregated customer interaction data,
wherein receiving customer interaction data comprises handling, through a contact center consumer interaction, a product failure covered by warranty, the handling including:
based on a contact center interaction related to the product failure covered by warranty, collecting contact center interaction information that includes failure cause information, product data, customer data, use and behavior data, user guide feedback, and online use data;
using the collected contact center interaction information to perform ongoing business research and to optimize a user guide, a product design, and a user interface related to the product failure covered by warranty;
based on a warranty execution interaction related to the product failure covered by warranty, collecting warranty execution interaction information that includes materials information, average cost to repair, first time resolution, genealogy, design versus manufacturing data, cycle time of repair, technical document quality information, and service quality information;
using the warranty execution interaction information to optimize product costs, to optimize repair and replacement costs, to perform service benchmarking, and to design a lower cost of quality;
based on a post repair service contract sale and cross sell interaction related to the product failure covered by warranty, collecting post repair service contract sale and cross sell interaction information that includes risk management versus feature data, consumer behavior data, and complementary product data;
using the post repair service contract sale and cross sell interaction information to generate new revenue, to perform margin portfolio optimization, and to perform ongoing business research;
based on a satisfaction survey interaction related to the product failure covered by warranty, collecting satisfaction survey interaction information that includes process effectiveness information, feature benefit information, and future marketing opt-in information; and
using the satisfaction survey interaction information to optimize warranty costs, to perform ongoing business research, and to maintain a dynamic targeted promotion database.

\* \* \* \* \*